(12) United States Patent
Krishnaswamy et al.

(10) Patent No.: US 7,808,903 B2
(45) Date of Patent: Oct. 5, 2010

(54) SYSTEM AND METHOD OF FORECASTING USAGE OF NETWORK LINKS

(75) Inventors: Murali Krishnaswamy, Piscataway, NJ (US); Sambasiva R. Bhatta, Tampa, FL (US); Edward W. Ritzer, Sutton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 242 days.

(21) Appl. No.: 12/054,726

(22) Filed: Mar. 25, 2008

(65) Prior Publication Data

US 2009/0245107 A1  Oct. 1, 2009

(51) Int. Cl.
 *G01R 31/08* (2006.01)
(52) U.S. Cl. .................. 370/232; 370/252; 709/224
(58) Field of Classification Search ................ 370/230, 370/230.1, 231, 232, 233, 234, 235, 252, 370/253; 709/224
See application file for complete search history.

(56) References Cited

U.S. PATENT DOCUMENTS

| 6,842,424 | B1 * | 1/2005 | Key et al. ................. 370/236 |
| 6,917,590 | B1 * | 7/2005 | Oliva ........................ 370/232 |
| 2002/0152305 | A1 * | 10/2002 | Jackson et al. ............ 709/224 |
| 2003/0229695 | A1 * | 12/2003 | McBride ................... 709/224 |
| 2004/0111509 | A1 * | 6/2004 | Eilam et al. .............. 709/224 |
| 2008/0046165 | A1 * | 2/2008 | Downs et al. ............. 701/117 |
| 2008/0071465 | A1 * | 3/2008 | Chapman et al. .......... 701/117 |

* cited by examiner

*Primary Examiner*—Chi H. Pham
*Assistant Examiner*—Kevin Mew

(57) ABSTRACT

An approach is provided for forecasting usage of network links. The method includes determining traffic data values for traffic over a network link that is used to provide one or more services to one or more customers, where the traffic data values are taken at intervals for a predetermined range of time. A historical data set of peak traffic data values is compiled from the traffic data values. A mathematical confidence factor is applied to the peak traffic data values to achieve modified data values, and a time-based weighting factor is applied to the modified data values to achieve further modified data values. And, a forecast trend curve of traffic over the network is calculated using the further modified data values.

22 Claims, 8 Drawing Sheets

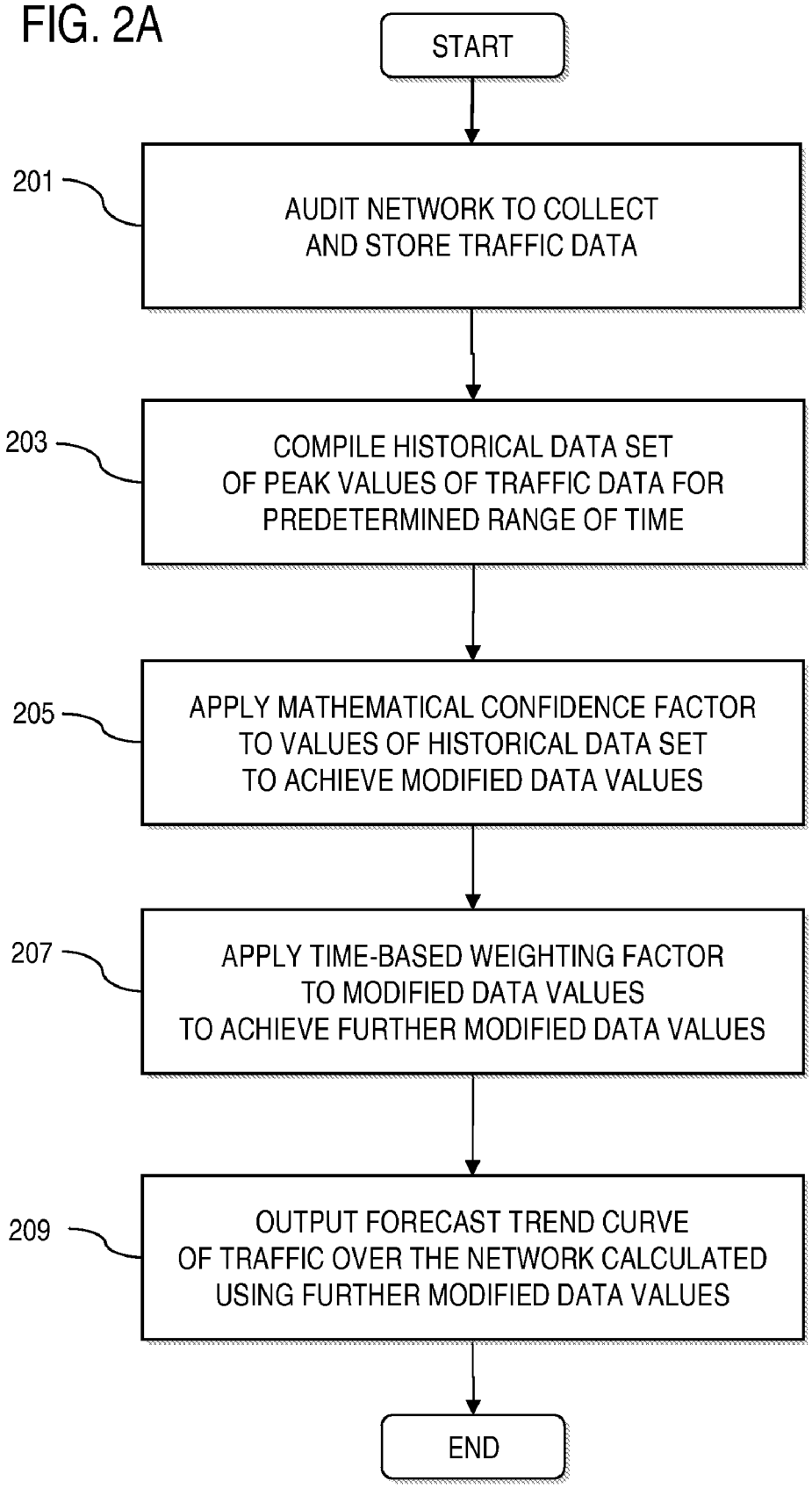

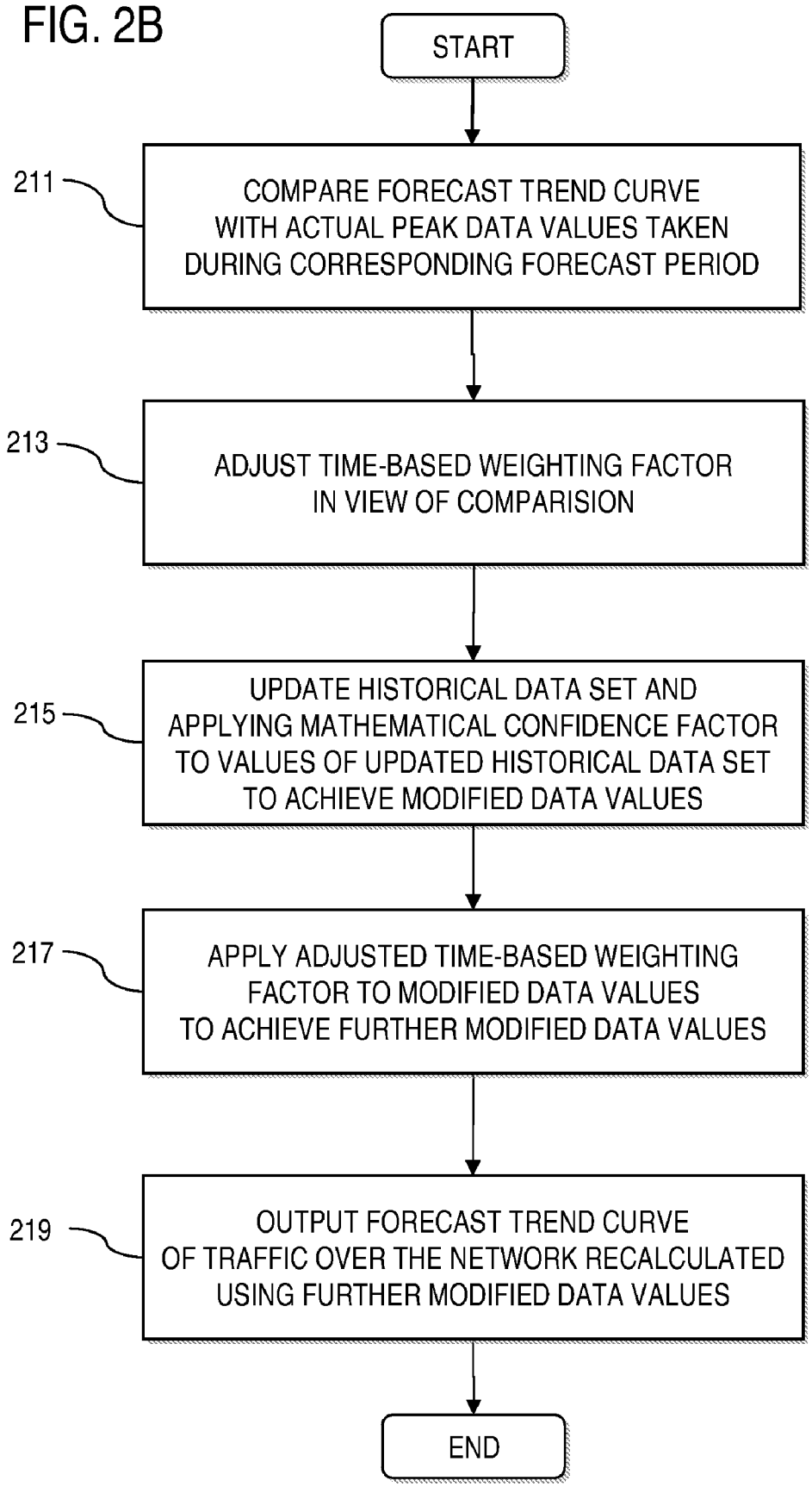

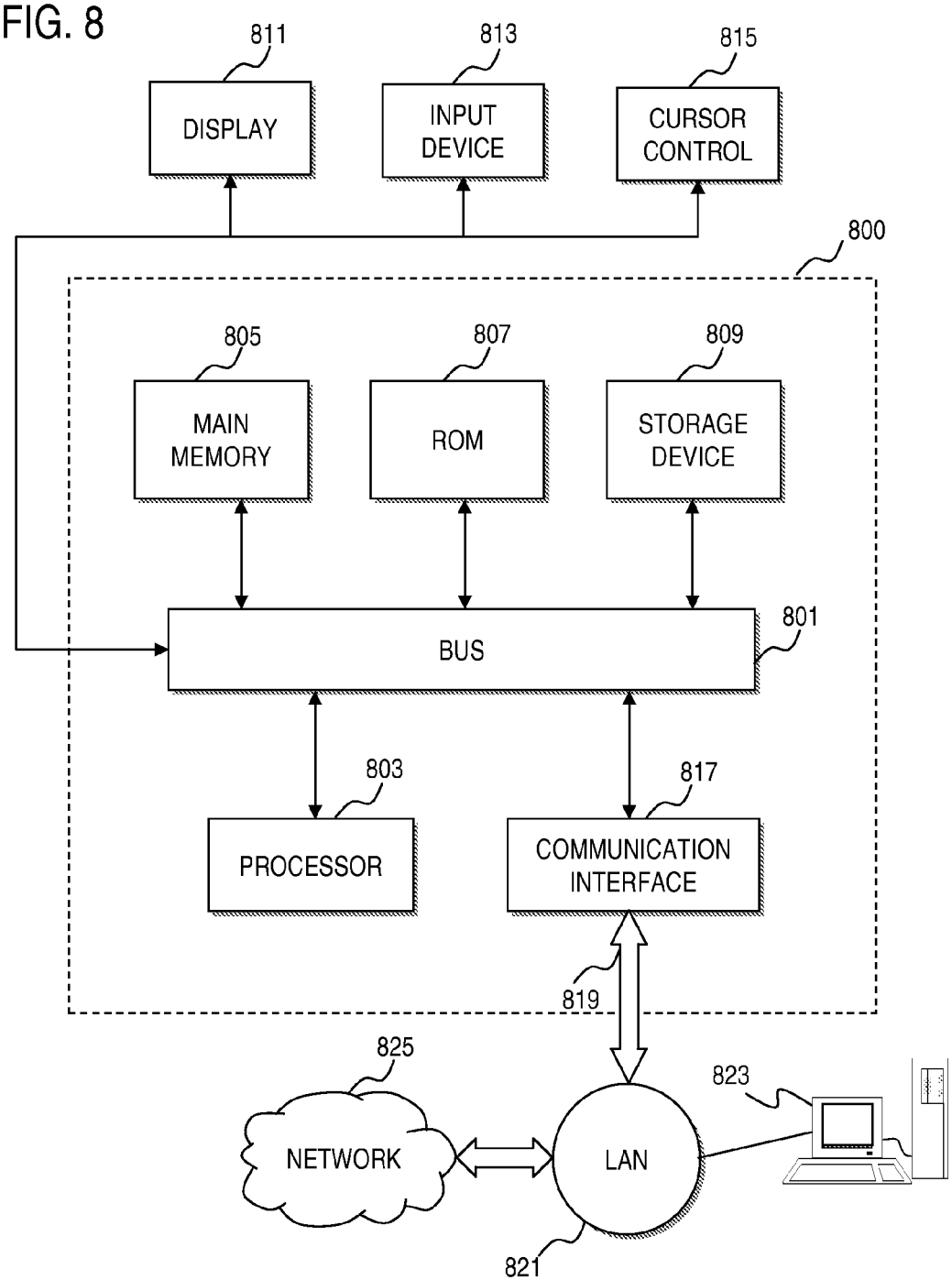

SYSTEM AND METHOD OF FORECASTING USAGE OF NETWORK LINKS

BACKGROUND OF THE INVENTION

Packet data networks (e.g. internet protocol (IP) networks) are generally bursty in nature. The level of traffic (e.g. voice, video, data, etc.) utilizing a network link can greatly fluctuate at any given time, and trends in usage can vary over periods of time. Network operators must attempt to ensure both quality of service (QoS) guarantees for services provided, and service level agreement (SLA) requirements to customers. IP networks must be able to adapt to changing trends in traffic on the network in order to efficiently utilize resources of the network, and ensure QoS and satisfy SLA requirements.

Physical changes to the network, such as upgrading of network link hardware, the addition of new network links, etc., that are needed to respond to changes in traffic on the network require planning and time to implement. Thus, addressing problems regarding growth in usage as such problems arise will result in a lag in implementation of solutions to the problems. Additionally, due to the lag-time between the detection of a problem and the implementation of the solution to the problem, a situation can arise where the solution that is implemented is itself outdated, as compared to current network requirements.

Therefore, there is a need for accurately forecasting future usage of a network to timely provide traffic management and engineering.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2A is a flow chart of a process for forecasting future usage of a network, according to an exemplary embodiment;

FIG. 2B is a flow chart of a process for adjusting the forecast of future usage of the network, according to an exemplary embodiment;

FIG. 8 is a diagram of a computer system that can be used to implement various exemplary embodiments.

DESCRIPTION OF THE PREFERRED EMBODIMENT

Figure 1:
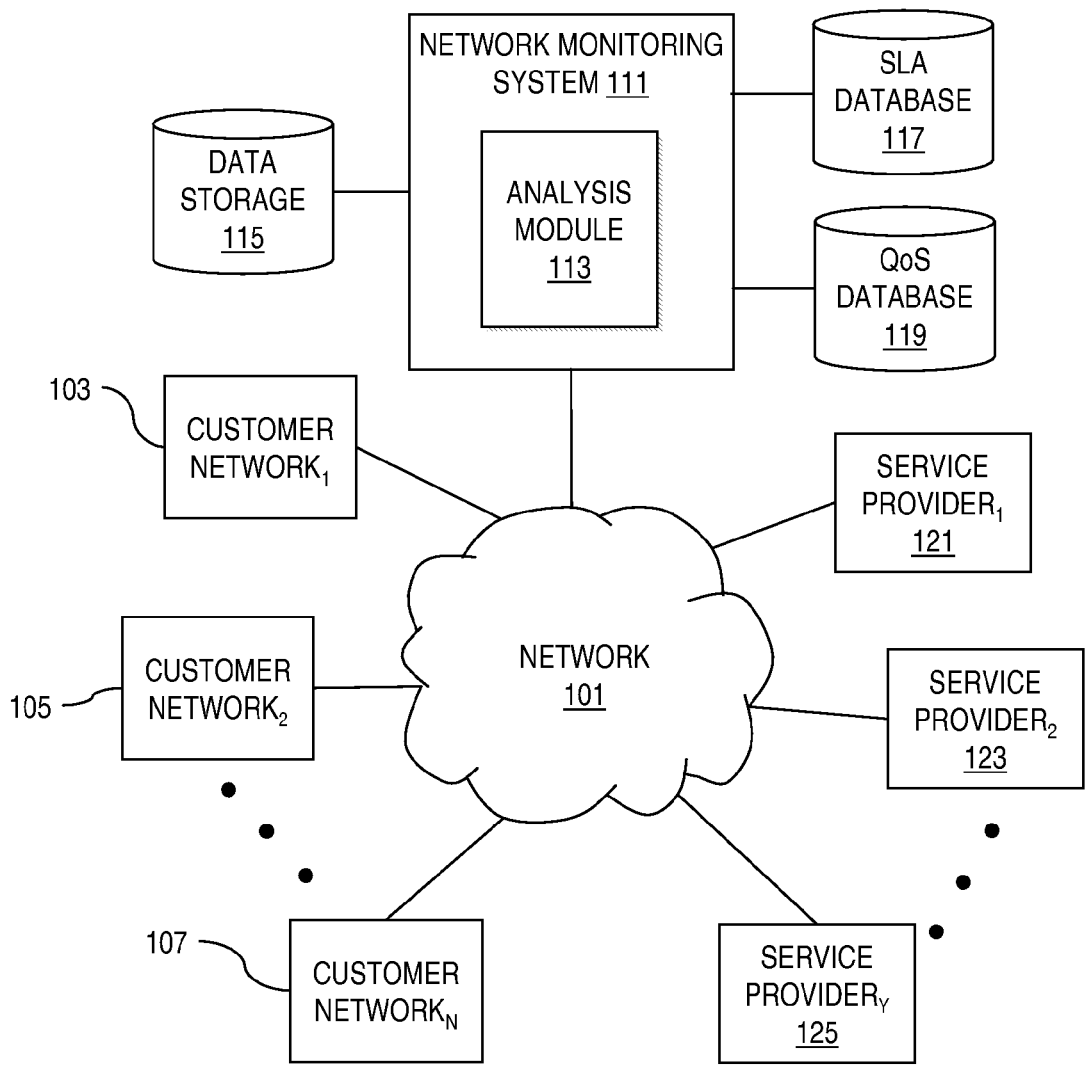
FIG. 1 is a system diagram of a network monitoring system connected to a multi-service network providing service to customers, according to an exemplary embodiment.

An apparatus, method, and software for forecasting future usage of a network used to carry traffic from a service provider to customers are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Today communication networks transfer a variety of different types of information between service providers and customers. Such networks can carry voice, video, and data traffic to provide a broad range of services to customers. For example, various computer networks are used to interconnect computing devices (personal computers, workstations, peripheral devices, etc.) for use in both personal and business settings. Businesses may utilize computer networks that cover broad geographical areas and utilize a collection of computer networking devices (e.g., routers, switches, hubs, etc.) for use by their employees and to interconnect various remote offices. Also, various service providers may provide multiple services to customers for entertainment or business-related reasons through devices capable of processing signals for presentation to a customer, such as a set-top box (STB), a home communication terminal (HCT), a digital home communication terminal (DHCT), a stand-alone personal video recorder (PVR), a television set, a digital video disc (DVD) player, a video-enabled phone, a video-enabled personal digital assistant (PDA), and/or a personal computer (PC), as well as other like technologies and customer premises equipment (CPE).

In certain instances it is advantageous to provide a unified multi-service network for voice, video, and data traffic to provide a rich set of services in an economical manner. For example, a multi-service network can be used by a service provider to provide customers with augmented data and/or video content to provide, e.g., sports coverage, weather forecasts, traffic reports, commentary, community service information, etc., and augmented content, e.g., advertisements, broadcasts, video-on-demand (VOD), interactive television programming guides, links, marketplace information, etc. In this manner, a customer of the service may seamlessly obtain traditional internet protocol (IP) based data combined with supplemental media rich information. Such a multi-service network could also be used to provide the customer with the ability to use the network as a telephone using voice over internet protocol (VOIP) transmissions.

Network links used to carry the information traffic throughout the network by nature have limited capacity to carry traffic. Network operators can configure the network (e.g., by adding links, by replacing a link with a link of increased capacity, etc.) in such a way as to increase the overall capacity of the network; however, due to the costs associated with increased capacity, it is desirable to not unnecessarily increase capacity. Another factor that the network operators must consider when configuring the network is the need to provide services to customers in a manner that assures integrity of the information being transmitted and quality of the service being provided to the customer. Network operators have to ensure that the network meets customer Service Level Agreement (SLA) requirements and Quality of Service (QoS) guarantees, for example, by ensuring that the network has sufficient bandwidth to handle the traffic on the network, and that the bandwidth is appropriately apportioned to services and/or customers. When an SLA requirement and/or a QoS guarantee is not met or crosses a threshold, then corrective action (e.g., reallocation of resources, addition and/or upgrade of resources, etc.) may be necessary.

The growth or contraction of customer usage of a network over time can have serious effects on the ability of a network to satisfy SLA requirements and/or QoS guarantees. For example, the growth of the number of employees in a company, and thus the number of employees utilizing a computing network of the company, can increase over time to a point where the network link(s) is being over-utilized and data transmission slows down. As the data communication amongst units of a business is important to the operation of the business, fast and efficient flow of data throughout the business is essential. Thus, such a situation can have serious consequences to the business.

With some types of customers and/or services, changes in usage of the network can be rapid in nature. Internet protocol (IP) networks are generally bursty in nature; the level of traffic (e.g. voice, video, data, etc.) utilizing a network link can greatly fluctuate at any given time, and trends in usage can vary over periods of time. IP networks must be able to adapt to changing trends in traffic on the network in order to efficiently utilize resources of the network, and ensure QoS guarantees and satisfy SLA requirements.

Physical changes to the network, such as upgrading of network link hardware, the addition of new network links, etc., that are needed to respond to changes in traffic on the network require planning and time to implement. Thus, addressing problems regarding growth in usage as such problems arise will result in a lag in implementation of solutions to the problems. Additionally, due to the lag-time between the detection of a problem and the implementation of the solution to the problem, a situation can arise where the solution that is implemented is itself outdated, as compared to current network requirements. Thus, a system is needed that can monitor network usage and forecast future usage of the network so that forecasted problems in the network can be corrected before or as such problems arise by modifying the network in order to handle the forecasted usage.

FIG. 1 is a diagram of a system capable of monitoring a network in order to collect data regarding usage of the network, and analyze and accurately forecast future usage of the network.

In FIG. 1, a network 101 is depicted, such as a multi-service network that can carry voice, video, and/or data traffic from one or more service providers to one or more customers. In FIG. 1, the network 101 serves service provider$_1$ 121, service provider$_2$ 123, . . . , and service providers 125, where Y is the total number of service providers, as well as customer network$_1$ 103, customer network$_2$ 105, . . . , and customer network$_N$ 107, where N is the total number of customer networks.

A network monitoring system 111 is connected to the network 101 in order to monitor the network, collect usage data, and analyze the usage data to forecast future usage using an analysis module 113. The network monitoring system 111 can interface with or incorporate a data storage 115 that is used to store usage (traffic) data collected by the network monitoring system 111 from the network 101. The network monitoring system 111 can also interface with or incorporate an SLA database 117 and a QoS database 119, which can be used to assess whether the network 101 is satisfying SLA requirements and/or QoS guarantees, respectively.

Thus, the network monitoring system 111 can periodically audit the network 101 to collect data related to the network including the network links between the service providers and the customers. By way of example, the network 101 can include a networking device that provides connectivity between the one or more service providers and the one or more customers. For example, the networking device can be any type of customer premise equipment (CPE) for supporting the networking technology utilized by the network. For example, the networking device can be a switch that provides either frame relay, Asynchronous Transfer Mode (ATM), Fiber Distributed Data Interface (FDDI), synchronous optical network (SONET), Multi Protocol Label Switching (MPLS), etc.; or a device that provides access to a dedicated leased line, e.g., add-drop multiplexer, etc. Thus, the system 111 can audit the network 101 and collect data relating to usage of the network from the networking device (e.g., router, etc.). This data can then be processed by the network monitoring system 111 and stored in the data storage 115 for later analysis.

The network device, such as a router, operates at the physical layer, link layer and network layer of the Open Systems Interconnection (OSI) model to transport data across the network 101. For example, the router can behave as an edge router to a router-based system within a data network. In general, the router can determine the "best" paths or routes by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), and Open Shortest Path First (OSPF). In addition to intelligently forwarding data, the routers can provide various other functions, such as firewalling, encryption, etc. These router functions can be performed using a general purpose computer (e.g., as shown in FIG. 8), or be highly specialized hardware platform with greater processing capability to process high volumes of data and hardware redundancies to ensure high reliability.

It should be noted that the system 111 can be used to monitor and analyze multiple networks 101. The data collection and analysis can be performed concurrently, wherein the data is stored and analyzed by the system for each particular network, or for each service provider and/or customer utilizing each particular network.

The auditing of the network 101 by the network monitoring system 111 can be performed according to a schedule (e.g., periodically) or on-demand to acquire sufficient data points to provide an accurate analysis of the usage of the network 101, as will be described in greater detail below. Additionally, assuming the networking device used by the network 101 is a router, the router can be configured to provide flow statements, such as Cisco NetFlow™ statements, for assisting with accurate data acquisition regarding traffic/bandwidth usage. Accordingly, the router can be periodically audited to ensure that configuration NetFlow™ statements supported so that flow information can be exported to the system 111.

In order to ensure QoS guarantees and thus meet SLA requirements, service provider networks, such as multi-service internet protocol (IP) networks, must be sized based on peak traffic requirements, and not based on the average traffic levels measured over some period of time. IP networks must be able to adapt to changing trends in peak traffic requirements in order to efficiently utilize resources of the network, and ensure QoS and satisfy SLA requirements. Physical changes to the network, such as upgrading of network link hardware, the addition of new network links, etc., that are needed to respond to changes in peak traffic requirements of the network require planning and time to implement. Hence, forecasting of future peak traffic requirements is a critical task for network operators. Network elements (NEs) and connecting fibers/cables/links are sized based on such forecasts, and need to be ordered and installed well in advance.

As noted above, FIG. 1 depicts a network monitoring system 111 connected to a multi-service network 101 providing service to customers (e.g., customer network, 103, customer network$_2$ 105, . . . , and customer network$_N$ 107), according to an exemplary embodiment. The network monitoring system is used to monitor and collect traffic data of the network to and from the various customers or customer networks.

Traffic data is collected by the system 111 at regular intervals (e.g., every 5 minutes, or every 15 minutes, etc.), for example, by an element management system (EMS) or by a network sniffer. Typically, both ingress and egress traffic flowing through an NE port are collected by the network monitoring system 111 and stored in data storage 115, and such data represents the in/out traffic on the network link connected to that port. Thus, the amount of traffic during a given period of time is collected, and a traffic rate is determined for that collection period by dividing the amount of traffic by the collection period (e.g., 5 minutes, 15 minutes, etc.). The more frequent the collection intervals, the more precise the traffic rate will be for any given time.

A database of traffic rates for each network link can be collected and organized into given time ranges in the data storage 115 for further analysis by the analysis module 113. For example, a database of traffic rates of the link can be collected for each day, or for each week, etc., for the analysis of a peak traffic rate, or an average traffic rate, etc. for that time range. Thus, a database containing traffic rates for each day would include 288 data points for traffic rates if the collection interval over the day is every 5 minutes, or 96 data points for traffic rates if the collection interval over the day is every 15 minutes. Using this database, the analysis module 113 can determine a peak traffic rate for each particular day for this link by finding the largest traffic rate value for that day. Similarly, peak traffic rates can be determined for each week, or each month, etc., or even for each hour if finer granularity of analysis is desired.

Prior to performing a forecast for future peak traffic rates, a sufficient amount of historical data should be collected in order to ensure the integrity of such a prediction. Once traffic rate data collection has been conducted for a period of time, such historical data can be used to perform traffic rate data curve fitting using a curve fitting method such as a Method of Least (Error) Squares.

In a curve fitting problem such as the one presented by the traffic rate data, the form of the function $y(x)=f(x)$ that is to fit the data can be assumed. One way is to represent this function $f(x)$ as a linear combination of simpler functions:

$$y(x)=f(x)=c_1 f_1(x)+c_2 f_2(x)+\ldots +c_m f_m(x).$$

In this function, the coefficients $c_1, c_2 \ldots c_m$ are unknown parameters.

How well this function fits is based on the error from the actual data sets. In the method of least squares, error, E, is calculated by adding up the squares of the errors at each of the observed points. (Squaring is done to eliminate cancellations among errors with different signs).

$$E=(f(x_1)-y_1)^2+(f(x_2)-y_2)^2+\ldots +(f(x_m)-y_m)^2.$$

Here, $x_1, y_1 \ldots y_m$ are the observed data sets.

A function $f(x)$ that results in the lowest E is the best curve fit through the observed data sets.

Regarding the selection of a function, a polynomial function (conforming to linear regression) is appropriate in this case and is easy to solve. So the above function is rewritten as:

$$y(x)=f(x)=c_1+c_2 \cdot x+c_3 \cdot x^2+\ldots +c_m \cdot x^{m-1}.$$

Since the focus here is on forecasting future traffic growth, the curve needs to be extended into the future (i.e., extrapolated). While higher order functions like $x^2$, $x^3$, etc. produce a good fit of the current data, such higher order functions lead to serious errors in calculation for future period due to oscillations. Hence, a first order function (i.e., a straight line function) is utilized here:

$$y(x)=f(x)=c_1+c_2 \cdot x.$$

To find the values of $c_1$ and $c_2$ that would result in the lowest error value of E, $dE/dc_1$ is set equal to zero, $dE/dc_2$ is set equal to zero, and it is verified that $d^2E/dc_1^2$ and $d^2E/dc_2^2$ are both positive.

Methods, such as mainly a Gaussian method, are used to solve the above equations and get the values of $c_1$ and $c_2$.

Use of a realistic collection of data is desirable for forecasting purposes. Thus, the selection of an appropriate data collection interval that provides a sufficient amount of data points is important, as well as the selection of a realistic range of historical data from the database of data values. If the range of historical data is too large and thus encompasses very old data points, a forecasting analysis using such data may lead to serious errors. For example, if the network usage was very low for a long period of time after the network link was first established, but has more recently seen a drastic change in growth trend, then the use of the old data in the forecasting analysis could skew the forecasting results and not provide an accurate forecast of the current trend. On the other hand, the use of too few data points (i.e., the historical data used in the forecast analysis does not extend over a sufficient range of time) can also make the forecast unreliable. The use of a range of historical data that is between 10 and 20 weeks or months has proven to be effective in many instances for forecasting usage trends for network links.

As mentioned above, the network links need to be planned to handle peak traffic and not the average of some values. Thus, the algorithm used is developed to forecast peak traffic growth in the future based on currently available historical data.

FIG. 2A sets forth a flowchart for a process for forecasting future traffic/usage of a network. In step 201, the network monitoring system 111 performs regular auditing of the network 101 to collect traffic data and store the data in the data storage 115. Once a sufficient amount of historical data is collected, the analysis module 113 can compile a historical data set of peak values of the traffic data for a predetermined range of time, as set forth in step 203. For example, the analysis module 113 can review the traffic data values taken during each day (or hour, or week, or month, etc.) and find a peak traffic value for each day, and compile a historical data set over a twelve week range of time that contains a peak traffic value for each day during that twelve week period. Then, in step 205, the analysis module 113 applies a confidence factor to the peak traffic values in the historical data set to achieve modified data values (i.e., the values labeled as "confidence factor applied" in the tables). Then, in step 207, the analysis module 113 applies a time-based weighting factor to the modified data values to achieve further modified data values (i.e., the values labeled as "time weighting factor applied" in the tables). The analysis module 113 then uses a method such as the Method of Least Squares to calculate a forecast trend curve (labeled as "proposed trend" in the tables and figures) of the traffic over the network 101 using the further modified data values and the forecast trend curve is output for use thereof, as set forth in step 209.

The resulting forecast trend curve and network capacity information can be compared with SLA requirements in the SLA database 117 and QoS guarantees in the QoS database 119 to determine whether the forecast includes growth that will require modification of the network configuration in order to meet the growth, and satisfy SLA requirements and QoS guarantees.

The forecasting algorithm can be updated from time to time in order to obtain a better understanding of, and possibly make adjustments to, the confidence factors and time-based weighting factors needed to effectively use the traffic forecasting algorithm. By fine-tuning the confidence factors and/or the time-based weighting factor, the traffic forecasting algorithm can achieve a much closer fit towards meeting the peak traffic requirements.

FIG. 2B is a flow chart of a process for adjusting the forecast of future usage of the network, according to an exemplary embodiment. Thus, the network monitoring system 111 continues to perform regular auditing of the network 101 to collect traffic data and store the data in the data storage 115, even after the forecast trend curve is generated in order to verify the accuracy thereof. Thus, in step 211, the actual data values are compared to the forecast trend curve, and then in step 213 the time-based weighting factor can be adjusted based on the comparison (e.g., see the examples below described with respect to Tables 3 and FIG. 4B, Table 5 and FIG. 5B, and Table 7 and FIG. 6B). Then, in step 215 the historical data set is updated with the most-recent twelve weeks of traffic data, the analysis module 113 applies the confidence factor to the updated historical data set to achieve modified data values. Then, in step 217, the analysis module 113 applies the adjusted time-based weighting factor to the modified data values to achieve further modified data values, and in step 219 the analysis module 113 then uses a method such as the Method of Least Squares to recalculate a forecast trend curve using the further modified data values and the recalculated forecast trend curve is output for use thereof.

The forecast algorithm can also take into account additional factors that influence the traffic growth itself, for example, the type of services using the link, and/or the number of customers allocated to the link. Thus, adjustments can be made to the parameters of the traffic algorithm so that the traffic forecasting algorithm can achieve a much closer fit towards meeting the peak traffic requirements.

Regarding the type of services using the link, services like video services require more bandwidth than voice services, and thus put more traffic into the network. However, the growth rate of video services could be different from other services. In such cases, the forecast algorithm can be used to forecast the traffic growth of video services separately from the traffic growth of other services using the link, and then merge the growth forecast data of the video services with the growth forecast for other services. Otherwise, the growth rate of high bandwidth services, like video services, would remain masked among the other traffic, and when there is a sudden spurt in the growth rate of the video services the network operators would be taken by surprise.

Thus, the forecast algorithm can be used to calculate growth forecasts for individual services where necessary, and incorporate the forecast results of those services into the overall traffic growth forecast over a network link.

Regarding the number of customers allocated to the link, it is general industry practice to allocate to a customer a certain maximum bandwidth based on the customer tier. Depending on the technology, this customer bandwidth could be allocated as a small pipe in a larger pipe (i.e., network link). The smaller pipes could be PVC, VLAN, etc. As more and more customers are added to the link, the traffic over the link would grow. However, when the link reaches its maximum customer (or PVC/VLAN) limit, the traffic growth would slow down, since additional traffic would come only from existing customers. The forecast algorithm can take this phenomenon into account by incorporating therein a correlation coefficient representative of the number of customers (or PVC/VLAN) with traffic. When the maximum customer limit is reached, the correlation coefficient can be removed, thus deducting this influence, in order to achieve a realistic forecast of future traffic.

Though the examples discussed above were with respect to an IP network, the forecast algorithm set forth herein is applicable to all types of networks and services where the requirement is to meet the peak traffic at any time. The forecast algorithm can be used for any type of network that carries any type of traffic, such as voice, video, data, etc.

The algorithm provides an easy-to-use and logical method to forecast peak traffic growth. The algorithm is fine-tunable by adjusting two values, namely a confidence factor and a time-based weighting factor. The values for these factors are derived from the historical data itself. Furthermore, the algorithm can take into account other influencing factors like the type of service, the number of customers, etc., thereby improving the accuracy of traffic growth forecast.

The forecast algorithm can be used to analyze networks that include thousands of NEs and links. For the purposes of explanation, five examples of network links are analyzed using the forecast algorithm to demonstrate the validity of the algorithm, and the collected and calculated data from these five examples are set forth in Tables 1-8 (set forth and discussed in greater detail below), and correspondingly depicted in FIGS. 3, 4A-B, 5A-B, 6A-B, and 7. These examples use 12 weeks of actual usage data to prepare the forecast trend, and then overlay and compare the subsequent 12 weeks of actual usage data with the forecast trend in order to demonstrate the validity of the forecast trend.

In the five examples, actual traffic data is collected over a period of 24 weeks using appropriate collection intervals. Tables 1-8 and FIGS. 3, 4A-B, 5A-B, 6A-B, and 7 represent the actual traffic data as a percentage of utilization of the network link capacity. In the examples, only the data points for the first 12 weeks (i.e., weeks 1-12) are used as the historical data to derive the trend curves and forecast usage trends over the next 12 weeks (i.e., weeks 13-24). The forecasted traffic is then compared against the actual data observed for weeks 13-24 in order to verify the algorithm used to generate the forecast.

Thus, in the five examples, only 12 weeks of actual data is used as historical data to forecast growth, and the forecast extends for 12 weeks into the future. Note that the historical data range and forecast period can be changed depending upon the needs of the network link being analyzed. Also, the forecast can be updated periodically, for example, every week or every other week, etc. using updated traffic data, and/or adjusted weighting factors, as will be discussed below.

In order to generate the "trend with actual data" in Tables 1-8 and FIGS. 3, 4A-B, 5A-B, 6A-B, and 7, the Method of Least Squares was used on the actual data to fit a curve as depicted. As can be seen from a review of FIGS. 3, 4A-B, 5A-B, 6A-B, and 7, the resulting curve captioned as "trend with actual data" produces values that lay significantly below the peak traffic, as shown in the actual data curve. Thus, using the trend with actual data alone to forecast future utilization of the link could be a costly mistake. Therefore, it has been determined that the use of the raw actual data to produce the forecast curve may not produce reliable and satisfactory results.

In view of the above problem, it is proposed to modify the historical data (i.e., the actual data) by a confidence factor and by a time-based weighting factor to produce a reliable forecast.

The confidence factor is applied to traffic data based on their individual spread (i.e., deviation) from the arithmetic mean of all the values in the history period, and thus is a mathematically-based weighting factor. For those data values that are nearer to the arithmetic mean, there is more confidence in their frequency of occurrence than those data values that are farther away from the arithmetic mean. The occurrence of data values that are far away from the arithmetic mean could be due to "chance" causes and therefore need to be normalized towards the arithmetic mean. Thus, data values that are far away from the arithmetic mean are given less weight than data values closer to the arithmetic mean using the following analysis.

$$Y(x) = y(x) \cdot c,$$

where x is the weeks (from 1 to 12), y and Y are the unmodified and modified traffic (in percentage utilization), and c is the confidence factor.

The value of c for y(x) is determined as follows:
if $(y(x)-m)=0$, then c is 1.0;
if $(y(x)-m)>0$, then c is <1.0; and
if $(y(x)-m)<0$, then c is >1.0, where m is the arithmetic mean of the history traffic data values. Note that the higher the value of $(y(x)-m)$, the lower the value of c. Similarly, the lower the value of $(y(x)-m)$, the higher the value of c.

However, instead of choosing individual values of c for each $(y(x)-m)$, it is easier and logical to group the c values into a number of bands or groupings, where each band value is measured in terms of standard deviations. The value s is the standard deviation of the data values from the arithmetic mean. The example below shows how the data $(y(x)-m)$ is divided into five groups and corresponding c values (0.8, 0.9, 1.0, 1.1 and 1.2) are selected:

For $(y(x)-m) \geq 0$ (i.e., for data points larger than the arithmetic mean):
if $(y(x)-m) \leq s$, then c=1.0;
if $(y(x)-m) > s$, and $(y(x)-m) \leq 2 \cdot s$, then c=0.9; and
if $(y(x)-m) > 2s$, then c=0.8, For $(y(x)-m) < 0$ (i.e., for data points smaller than the arithmetic mean):
if $-(y(x)-m) \leq s$, then c=1.0;
if $-(y(x)-m) > s$, and $-(y(x)-m) \leq 2s$, then c=1.1; and
if $-(y(x)-m) > 2s$, then c=1.2.

In addition to the above described confidence factor c, a time-based weighting factor is also applied to the traffic data. It should be noted that the time-based weighting factor is applied to the traffic data that is already normalized by application of the confidence factor.

The time-based weighting factor is applied to the traffic data in the history period, which in this case is the first 12 data points. Within the history period, the data that is more current is an indication of the recent trend or pattern of traffic utilization (growth, decline, or steady), and thus the more current data is weighted more than older data. This weighting factor is applied proportionately over the history period. Thus, each data point gets a weight based on its timewise distance from the origin data point (i.e., first data point in the historical data being evaluated). The further the data point is from the origin data point, the greater the weight given to the data point. An example is a weighting factor of 1.2. A formula for applying the time-based weighting factor is:

$$Y_1(x) = Y(x) \cdot ((0.2 \cdot x/12) + 1),$$

where x is the weeks (from 1 to 12), Y is the value discussed above, and $Y_1$ is the final modified value.

The Method of Least Squares is then used on the resulting final modified values to fit a forecasting curve, which is labeled in the tables and figures as the "proposed trend."

Tables 1-8 set forth below show results of the above analysis and calculations for the five examples. Table 1-8 show the data values for weeks 1-12 modified with the confidence factor applied, and then further modified with the time-based weighting factor applied, which are then used to generate the proposed trend curve using the method of least squares.

Figure 3:
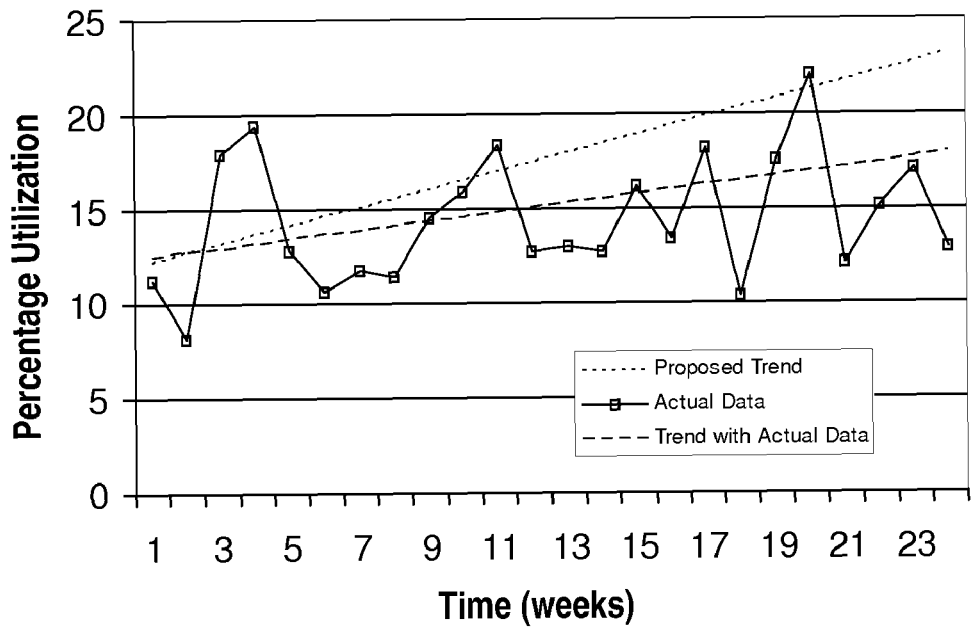
FIG. 3 is a graph depicting actual traffic data of a network link in percentage utilization of the network link over time, and overlaid with a trend curve used to forecast peak traffic requirements for the network link using actual data and a proposed trend curve used to forecast peak traffic requirements of the network link using modified data, according to an exemplary embodiment.

Table 1 set forth below shows results of the above analysis and calculations for the first example, and FIG. 3 is a corresponding graph of the results. The average percentage utilization of the percentage utilization values for weeks 1-12 in Table 1 and FIG. 3 is 13.74858333 and the standard deviation is 3.483337805.

TABLE 1

| Week | Actual Data | Trend With Actual Data | Actual Data Minus Average | Confidence Factor Applied | Time Weighting Factor Applied | Proposed Trend |
|---|---|---|---|---|---|---|
| 1 | 11.28 | 12.45371795 | −2.468583333 | 11.28 | 11.468 | 12.23036944 |
| 2 | 8.133 | 12.68914802 | −5.615583333 | 8.9463 | 9.24451 | 12.70578096 |
| 3 | 17.91 | 12.92457809 | 4.161416667 | 16.119 | 16.92495 | 13.18119247 |
| 4 | 19.34 | 13.16000816 | 5.591416667 | 17.406 | 18.5664 | 13.65660399 |
| 5 | 12.81 | 13.39543823 | −0.938583333 | 12.81 | 13.8775 | 14.13201551 |
| 6 | 10.67 | 13.6308683 | −3.078583333 | 10.67 | 11.737 | 14.60742702 |
| 7 | 11.79 | 13.86629837 | −1.958583333 | 11.79 | 13.1655 | 15.08283854 |
| 8 | 11.46 | 14.10172844 | −2.288583333 | 11.46 | 12.988 | 15.55825005 |
| 9 | 14.56 | 14.33715851 | 0.811416667 | 14.56 | 16.744 | 16.03366157 |
| 10 | 15.95 | 14.57258858 | 2.201416667 | 15.95 | 18.60833333 | 16.50907308 |
| 11 | 18.36 | 14.80801865 | 4.611416667 | 16.524 | 19.5534 | 16.9844846 |
| 12 | 12.72 | 15.04344872 | −1.028583333 | 12.72 | 15.264 | 17.45989611 |
| 13 | 12.94 | 15.27887879 | | | | 17.93530763 |
| 14 | 12.71 | 15.51430886 | | | | 18.41071914 |
| 15 | 16.14 | 15.74973893 | | | | 18.88613066 |
| 16 | 13.37 | 15.985169 | | | | 19.36154217 |
| 17 | 18.16 | 16.22059907 | | | | 19.83695369 |
| 18 | 10.34 | 16.45602914 | | | | 20.3123652 |
| 19 | 17.56 | 16.69145921 | | | | 20.78777672 |
| 20 | 22.02 | 16.92688928 | | | | 21.26318823 |
| 21 | 12.08 | 17.16231935 | | | | 21.73859975 |
| 22 | 15.14 | 17.39774942 | | | | 22.21401126 |
| 23 | 17.11 | 17.63317949 | | | | 22.68942278 |
| 24 | 12.86 | 17.86860956 | | | | 23.16483429 |

Regarding the first example as shown in Table 1 and FIG. 3, the proposed trend curve made using the modified data extends above the trend curve made with actual data. While the trend curve made with actual data is clearly below many of the peaks in the actual data curve, the proposed trend curve meets all the forecast growth points without much over-shoot. Note that, at the time the forecast analysis will be performed, the actual data for weeks 13-24 will not yet be known; however, the comparison of the trend curve and the proposed trend curve in weeks 13-24 with the actual data of weeks 13-24 in the five examples allows for a checking of the accuracy of the forecast, and validation of the forecasting approach being used. As can be seen in FIG. 3 with respect to the first example, the proposed trend curve provides a much better forecast of the growth of the usage of the network link being analyzed over weeks 13-24, as compared to the trend curve made with raw data values, which misses many peaks and would result in a failure to ensure QoS guarantees and meet SLA requirements for that link.

Figure 4A:
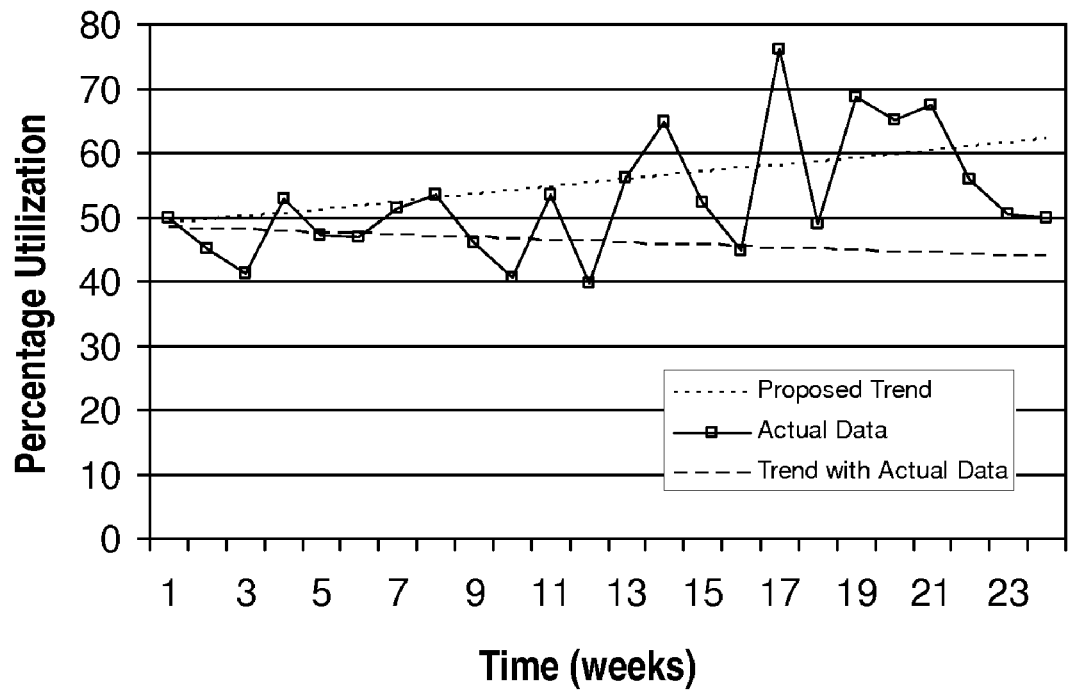
FIG. 4A is a graph depicting actual traffic data of another network link in percentage utilization of the network link over time, and overlaid with a trend curve used to forecast peak traffic requirements for the network link using actual data and a proposed trend curve used to forecast peak traffic requirements of the network link using modified data, according to an exemplary embodiment.
Figure 4B:
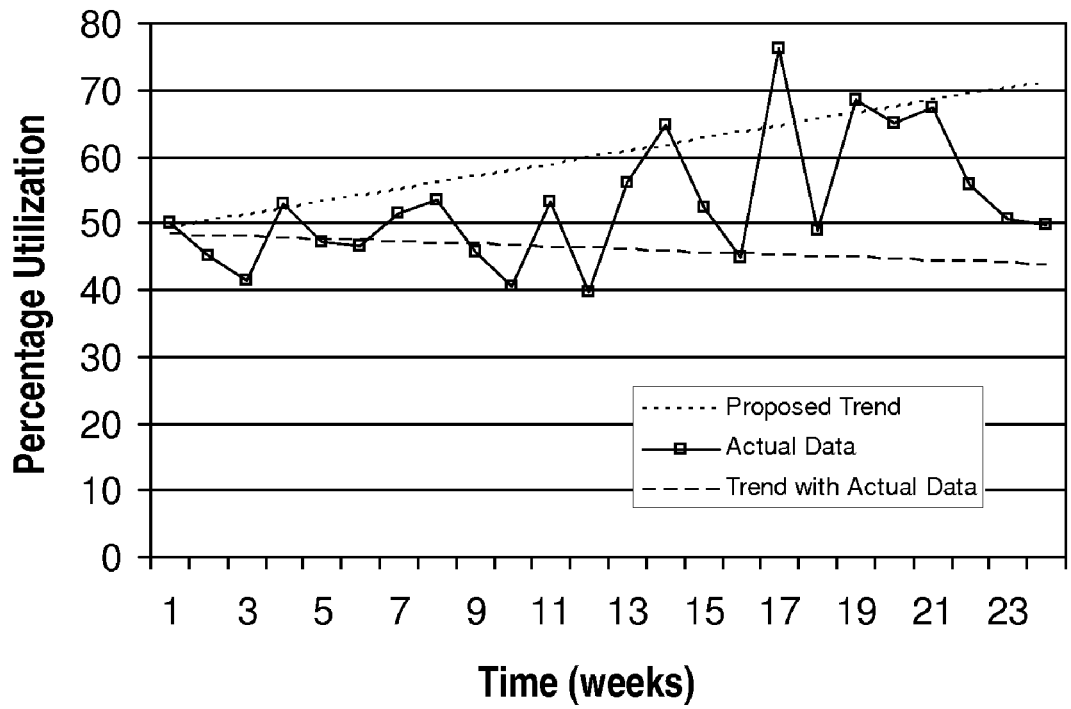
FIG. 4B is a graph including the same actual data traffic curve and trend curve as represented in FIG. 4A, overlaid with a proposed trend curve that has been further modified as compared to FIG. 4A, according to an exemplary embodiment.

Tables 2 and 3 set forth below show results of the analysis and calculations for the second example, and FIGS. 4A and 4B are corresponding graphs of the results. The average percentage utilization of the percentage utilization values for weeks 1-12 in Tables 2 and 3 and FIGS. 4A and 4B is 42.295 and the standard deviation is 4.995407891.

TABLE 2

| Week | Actual Data | Trend With Actual Data | Actual Data Minus Average | Confidence Factor Applied | Time Weighting Factor Applied | Proposed Trend |
|---|---|---|---|---|---|---|
| 1 | 50 | 48.39653846 | 2.705 | 50 | 50.83333333 | 48.87427949 |
| 2 | 45.22 | 48.19625874 | −2.075 | 45.22 | 46.72733333 | 49.44831049 |
| 3 | 41.3 | 47.99597902 | −5.995 | 45.43 | 47.7015 | 50.02234149 |
| 4 | 52.86 | 47.7956993 | 5.565 | 47.574 | 50.7456 | 50.59637249 |
| 5 | 47.16 | 47.59541958 | −0.135 | 47.16 | 51.09 | 51.1704035 |
| 6 | 46.72 | 47.39513986 | −0.575 | 46.72 | 51.392 | 51.7444345 |
| 7 | 51.37 | 47.19486014 | 4.075 | 51.37 | 57.36316667 | 52.3184655 |
| 8 | 53.45 | 46.99458042 | 6.155 | 48.105 | 54.519 | 52.8924965 |
| 9 | 45.84 | 46.7943007 | −1.455 | 45.84 | 52.716 | 53.46652751 |
| 10 | 40.7 | 46.59402098 | −6.595 | 44.77 | 52.23166667 | 54.04055851 |
| 11 | 53.32 | 46.39374126 | 6.025 | 47.988 | 56.7858 | 54.61458951 |
| 12 | 39.6 | 46.19346154 | −7.695 | 43.56 | 52.272 | 55.18862051 |
| 13 | 56.14 | 45.99318182 | | | | 55.76265152 |
| 14 | 64.73 | 45.7929021 | | | | 56.33668252 |
| 15 | 52.26 | 45.59262238 | | | | 56.91071352 |
| 16 | 44.9 | 45.39234266 | | | | 57.48474452 |
| 17 | 76.13 | 45.19206294 | | | | 58.05877552 |
| 18 | 48.96 | 44.99178322 | | | | 58.63280653 |
| 19 | 68.53 | 44.7915035 | | | | 59.20683753 |
| 20 | 64.95 | 44.59122378 | | | | 59.78086853 |
| 21 | 67.37 | 44.39094406 | | | | 60.35489953 |
| 22 | 55.96 | 44.19066434 | | | | 60.92893054 |
| 23 | 50.55 | 43.99038462 | | | | 61.50296154 |
| 24 | 49.76 | 43.7901049 | | | | 62.07699254 |

TABLE 3

| Week | Actual Data | Trend With Actual Data | Actual Data Minus Average | Confidence Factor Applied | Time Weighting Factor Applied | Proposed Trend |
|---|---|---|---|---|---|---|
| 1 | 50 | 48.39653846 | 2.705 | 50 | 51.25 | 49.32494487 |
| 2 | 45.22 | 48.19625874 | −2.075 | 45.22 | 47.481 | 50.27643368 |
| 3 | 41.3 | 47.99597902 | −5.995 | 45.43 | 48.83725 | 51.22792249 |
| 4 | 52.86 | 47.7956993 | 5.565 | 47.574 | 52.3314 | 52.17941131 |
| 5 | 47.16 | 47.59541958 | −0.135 | 47.16 | 53.055 | 53.13090012 |
| 6 | 46.72 | 47.39513986 | −0.575 | 46.72 | 53.728 | 54.08238893 |
| 7 | 51.37 | 47.19486014 | 4.075 | 51.37 | 60.35975 | 55.03387774 |
| 8 | 53.45 | 46.99458042 | 6.155 | 48.105 | 57.726 | 55.98536655 |
| 9 | 45.84 | 46.7943007 | −1.455 | 45.84 | 56.154 | 56.93685536 |
| 10 | 40.7 | 46.59402098 | −6.595 | 44.77 | 55.9625 | 57.88834417 |
| 11 | 53.32 | 46.39374126 | 6.025 | 47.988 | 61.1847 | 58.83983298 |
| 12 | 39.6 | 46.19346154 | −7.695 | 43.56 | 56.628 | 59.79132179 |
| 13 | 56.14 | 45.99318182 | | | | 60.74281061 |
| 14 | 64.73 | 45.7929021 | | | | 61.69429942 |
| 15 | 52.26 | 45.59262238 | | | | 62.64578823 |
| 16 | 44.9 | 45.39234266 | | | | 63.59727704 |
| 17 | 76.13 | 45.19206294 | | | | 64.54876585 |
| 18 | 48.96 | 44.99178322 | | | | 65.50025466 |
| 19 | 68.53 | 44.7915035 | | | | 66.45174347 |
| 20 | 64.95 | 44.59122378 | | | | 67.40323228 |
| 21 | 67.37 | 44.39094406 | | | | 68.3547211 |
| 22 | 55.96 | 44.19066434 | | | | 69.30620991 |
| 23 | 50.55 | 43.99038462 | | | | 70.25769872 |
| 24 | 49.76 | 43.7901049 | | | | 71.20918753 |

Regarding the second example as shown in Table 2 and FIG. 4A, the proposed trend curve made using the modified data extends above the trend curve made with raw actual data. The trend curve made with actual data is clearly below all of the peaks in the actual data curve, and in fact forecasts a downward trend in usage, which is clearly an error as can be seen in the growth shown in weeks 13-24. While the proposed trend curve misses some of the peaks, the proposed trend curve is much closer to the peaks than the trend curve made with the raw actual data. The data in this example pertains to a case of a fast growing network. In such situations, the proposed trend curve can be adjusted to meet the peaks by suitably adjusting (e.g. increasing) the time-based weighting factor. Table 3 and FIG. 4B show the effect of increasing the time-based weighting factor from 1.2 (as in Table 2 and FIG. 4A) to 1.3 (as in Table 3 and FIG. 4B). As can be seen in FIG. 4B, when the time-based weighting factor is increased to 1.3, the proposed trend curve is able to closely meet the peaks over weeks 13-24.

Figure 5A:
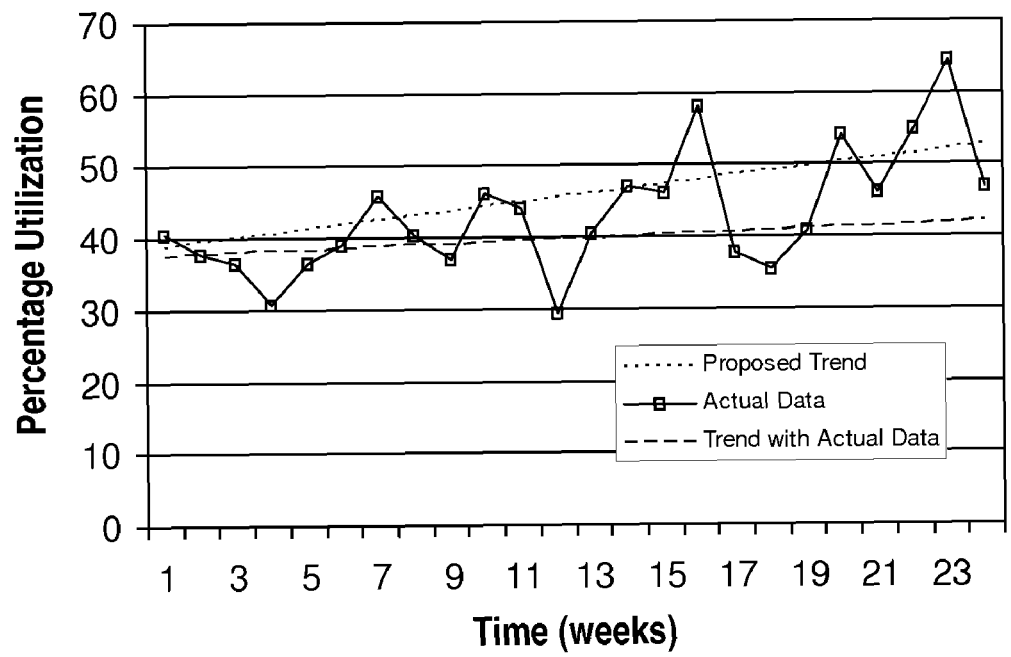
FIG. 5A is a graph depicting actual traffic data of yet another network link in percentage utilization of the network link over time, and overlaid with a trend curve used to forecast peak traffic requirements for the network link using actual data and a proposed trend curve used to forecast peak traffic requirements of the network link using modified data, according to an exemplary embodiment.
Figure 5B:
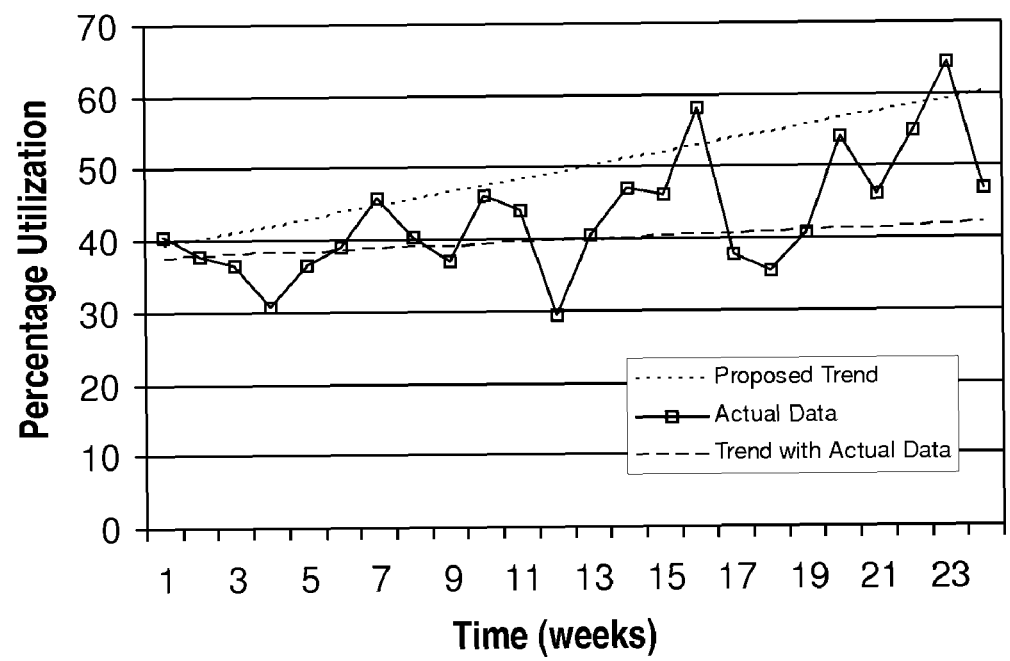
FIG. 5B is a graph including the same actual data traffic curve and trend curve as represented in FIG. 5A, overlaid with a proposed trend curve that has been further modified as compared to FIG. 5A, according to an exemplary embodiment.

Tables 4 and 5 set forth below show results of the analysis and calculations for the third example, and FIGS. 5A and 5B are corresponding graphs of the results. The average percentage utilization of the percentage utilization values for weeks 1-12 in Tables 4 and 5 and FIGS. 5A and 5B is 38.6525 and the standard deviation is 5.258145413.

TABLE 4

| Week | Actual Data | Trend With Actual Data | Actual Data Minus Average | Confidence Factor Applied | Time Weighting Factor Applied | Proposed Trend |
|---|---|---|---|---|---|---|
| 1 | 40.53 | 37.61653846 | 1.8775 | 40.53 | 41.2055 | 38.81500833 |
| 2 | 37.73 | 37.8048951 | −0.9225 | 37.73 | 38.98766667 | 39.41857727 |
| 3 | 36.47 | 37.99325175 | −2.1825 | 36.47 | 38.2935 | 40.02214621 |
| 4 | 30.68 | 38.18160839 | −7.9725 | 33.748 | 35.99786667 | 40.62571515 |
| 5 | 36.44 | 38.36996503 | −2.2125 | 36.44 | 39.47666667 | 41.22928409 |
| 6 | 39.1 | 38.55832168 | 0.4475 | 39.1 | 43.01 | 41.83285303 |
| 7 | 45.83 | 38.74667832 | 7.1775 | 41.247 | 46.05915 | 42.43642197 |
| 8 | 40.23 | 38.93503497 | 1.5775 | 40.23 | 45.594 | 43.03999091 |
| 9 | 37.08 | 39.12339161 | −1.5725 | 37.08 | 42.642 | 43.64355985 |
| 10 | 46.08 | 39.31174825 | 7.4275 | 41.472 | 48.384 | 44.24712879 |
| 11 | 44.18 | 39.5001049 | 5.5275 | 39.762 | 47.0517 | 44.85069773 |
| 12 | 29.48 | 39.68846154 | −9.1725 | 32.428 | 38.9136 | 45.45426667 |
| 13 | 40.45 | 39.87681818 | | | | 46.05783561 |
| 14 | 47.17 | 40.06517483 | | | | 46.66140455 |
| 15 | 46 | 40.25353147 | | | | 47.26497348 |
| 16 | 58.05 | 40.44188811 | | | | 47.86854242 |
| 17 | 37.83 | 40.63024476 | | | | 48.47211136 |
| 18 | 35.5 | 40.8186014 | | | | 49.0756803 |
| 19 | 40.82 | 41.00695804 | | | | 49.67924924 |
| 20 | 54.08 | 41.19531469 | | | | 50.28281818 |
| 21 | 46.14 | 41.38367133 | | | | 50.88638712 |
| 22 | 54.88 | 41.57202797 | | | | 51.48995606 |
| 23 | 64.39 | 41.76038462 | | | | 52.093525 |
| 24 | 46.71 | 41.94874126 | | | | 52.69709394 |

TABLE 5

| Week | Actual Data | Trend With Actual Data | Actual Data Minus Average | Confidence Factor Applied | Time Weighting Factor Applied | Proposed Trend |
|---|---|---|---|---|---|---|
| 1 | 40.53 | 37.61653846 | 1.8775 | 40.53 | 41.54325 | 39.15837788 |
| 2 | 37.73 | 37.8048951 | −0.9225 | 37.73 | 39.6165 | 40.07359668 |
| 3 | 36.47 | 37.99325175 | −2.1825 | 36.47 | 39.20525 | 40.98881547 |
| 4 | 30.68 | 38.18160839 | −7.9725 | 33.748 | 37.1228 | 41.90403427 |
| 5 | 36.44 | 38.36996503 | −2.2125 | 36.44 | 40.995 | 42.81925306 |
| 6 | 39.1 | 38.55832168 | 0.4475 | 39.1 | 44.965 | 43.73447185 |
| 7 | 45.83 | 38.74667832 | 7.1775 | 41.247 | 48.465225 | 44.64969065 |
| 8 | 40.23 | 38.93503497 | 1.5775 | 40.23 | 48.276 | 45.56490944 |
| 9 | 37.08 | 39.12339161 | −1.5725 | 37.08 | 45.423 | 46.48012823 |
| 10 | 46.08 | 39.31174825 | 7.4275 | 41.472 | 51.84 | 47.39534703 |
| 11 | 44.18 | 39.5001049 | 5.5275 | 39.762 | 50.69655 | 48.31056582 |
| 12 | 29.48 | 39.68846154 | −9.1725 | 32.428 | 42.1564 | 49.22578462 |
| 13 | 40.45 | 39.87681818 | | | | 50.14100341 |
| 14 | 47.17 | 40.06517483 | | | | 51.0562222 |
| 15 | 46 | 40.25353147 | | | | 51.971441 |
| 16 | 58.05 | 40.44188811 | | | | 52.88665979 |
| 17 | 37.83 | 40.63024476 | | | | 53.80187858 |
| 18 | 35.5 | 40.8186014 | | | | 54.71709738 |
| 19 | 40.82 | 41.00695804 | | | | 55.63231617 |
| 20 | 54.08 | 41.19531469 | | | | 56.54753497 |
| 21 | 46.14 | 41.38367133 | | | | 57.46275376 |
| 22 | 54.88 | 41.57202797 | | | | 58.37797255 |
| 23 | 64.39 | 41.76038462 | | | | 59.29319135 |
| 24 | 46.71 | 41.94874126 | | | | 60.20841014 |

Regarding the third example as shown in Table 4 and FIG. 5A, the proposed trend curve made using the modified data extends above the trend curve made with raw actual data. The trend curve made with actual data is clearly below all of the peaks in the actual data curve. While the proposed trend curve misses some of the peaks, the proposed trend curve is much closer to the peaks than the trend curve made with the raw actual data. In Table 5 and FIG. 5B, the proposed trend curve is adjusted to meet the peaks by suitably adjusting (e.g. increasing) the time-based weighting factor. Table 5 and FIG. 5B show the effect of increasing the time-based weighting factor from 1.2 (as in Table 4 and FIG. 5A) to 1.3 (as in Table 5 and FIG. 5B). As can be seen in FIG. 5B, when the time-based weighting factor is increased to 1.3, the proposed trend curve is able to closely meet the peaks over weeks 13-24.

Figure 6A:
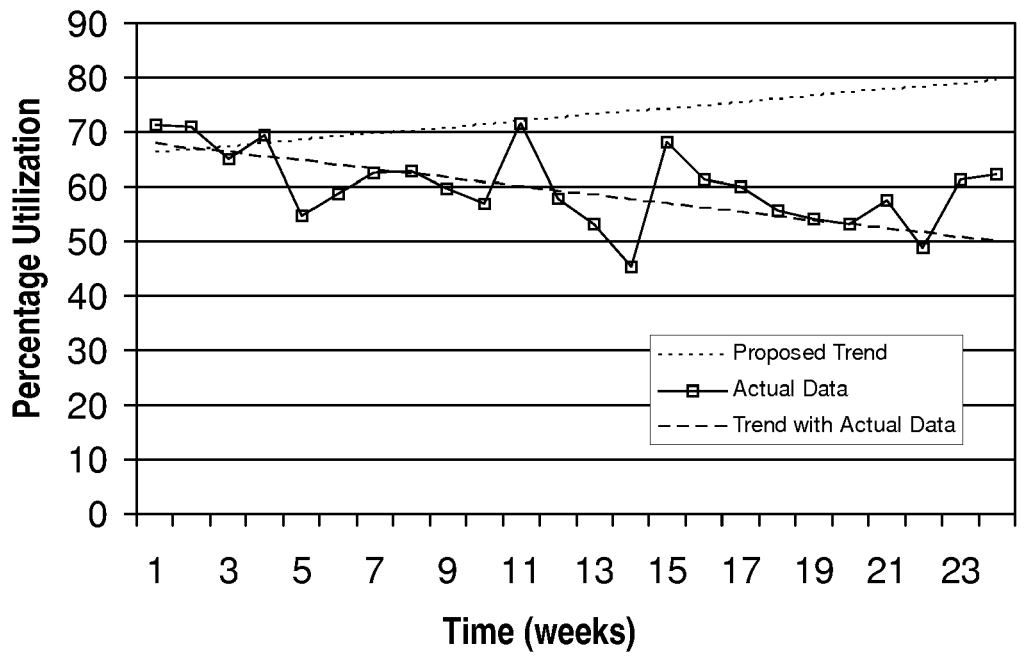
FIG. 6A is a graph depicting actual traffic data of a further network link in percentage utilization of the network link over time, and overlaid with a trend curve used to forecast peak traffic requirements for the network link using actual data and a proposed trend curve used to forecast peak traffic requirements of the network link using modified data, according to an exemplary embodiment.
Figure 6B:
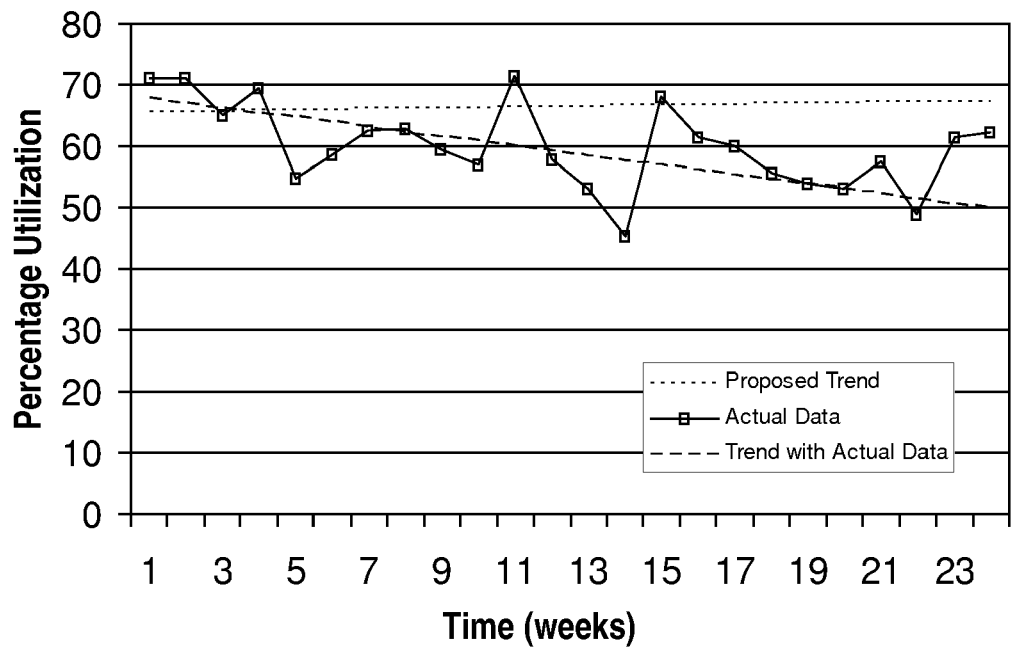
FIG. 6B is a graph including the same actual data traffic curve and trend curve as represented in FIG. 6A, overlaid with a proposed trend curve that has been further modified as compared to FIG. 6A, according to an exemplary embodiment.

Tables 6 and 7 set forth below show results of the analysis and calculations for the fourth example, and FIGS. 6A and 6B are corresponding graphs of the results. The average percentage utilization of the percentage utilization values for weeks 1-12 in Tables 6 and 7 and FIGS. 6A and 6B is 63.43916667 and the standard deviation is 6.110877721.

TABLE 6

| Week | Actual Data | Trend With Actual Data | Actual Data Minus Average | Confidence Factor Applied | Time Weighting Factor Applied | Proposed Trend |
|---|---|---|---|---|---|---|
| 1 | 71.17 | 67.70051282 | 7.730833333 | 64.053 | 65.12055 | 66.09937457 |
| 2 | 71.09 | 66.92572261 | 7.650833333 | 63.981 | 66.1137 | 66.67863046 |
| 3 | 65.12 | 66.1509324 | 1.680833333 | 65.12 | 68.376 | 67.25788634 |
| 4 | 69.5 | 65.37614219 | 6.060833333 | 69.5 | 74.13333333 | 67.83714223 |
| 5 | 54.67 | 64.60135198 | −8.769166667 | 60.137 | 65.14841667 | 68.41639812 |
| 6 | 58.73 | 63.82656177 | −4.709166667 | 58.73 | 64.603 | 68.995654 |
| 7 | 62.39 | 63.05177156 | −1.049166667 | 62.39 | 69.66883333 | 69.57490989 |
| 8 | 62.71 | 62.27698135 | −0.729166667 | 62.71 | 71.07133333 | 70.15416577 |
| 9 | 59.56 | 61.50219114 | −3.879166667 | 59.56 | 68.494 | 70.73342166 |
| 10 | 56.96 | 60.72740093 | −6.479166667 | 62.656 | 73.09866667 | 71.31267754 |
| 11 | 71.47 | 59.95261072 | 8.030833333 | 64.323 | 76.11555 | 71.89193343 |
| 12 | 57.9 | 59.17782051 | −5.539166667 | 57.9 | 69.48 | 72.47118932 |
| 13 | 53.15 | 58.4030303 | | | | 73.0504452 |
| 14 | 45.41 | 57.62824009 | | | | 73.62970109 |
| 15 | 68.18 | 56.85344988 | | | | 74.20895697 |
| 16 | 61.38 | 56.07865967 | | | | 74.78821286 |
| 17 | 60.02 | 55.30386946 | | | | 75.36746875 |
| 18 | 55.67 | 54.52907925 | | | | 75.94672463 |
| 19 | 53.98 | 53.75428904 | | | | 76.52598052 |
| 20 | 53.12 | 52.97949883 | | | | 77.1052364 |
| 21 | 57.53 | 52.20470862 | | | | 77.68449229 |
| 22 | 48.85 | 51.42991841 | | | | 78.26374817 |
| 23 | 61.33 | 50.65512821 | | | | 78.84300406 |
| 24 | 62.18 | 49.880338 | | | | 79.42225995 |

TABLE 7

| Week | Actual Data | Trend With Actual Data | Actual Data Minus Average | Confidence Factor Applied | Time Weighting Factor Applied | Proposed Trend |
|---|---|---|---|---|---|---|
| 1 | 71.17 | 67.70051282 | 7.730833333 | 64.053 | 64.586775 | 65.49937318 |
| 2 | 71.09 | 66.92572261 | 7.650833333 | 63.981 | 65.04735 | 65.57890672 |
| 3 | 65.12 | 66.1509324 | 1.680833333 | 65.12 | 66.748 | 65.65844026 |
| 4 | 69.5 | 65.37614219 | 6.060833333 | 69.5 | 71.81666667 | 65.7379738 |
| 5 | 54.67 | 64.60135198 | −8.769166667 | 60.137 | 62.64270833 | 65.81750733 |
| 6 | 58.73 | 63.82656177 | −4.709166667 | 58.73 | 61.6665 | 65.89704087 |
| 7 | 62.39 | 63.05177156 | −1.049166667 | 62.39 | 66.02941667 | 65.97657441 |
| 8 | 62.71 | 62.27698135 | −0.729166667 | 62.71 | 66.89066667 | 66.05610794 |
| 9 | 59.56 | 61.50219114 | −3.879166667 | 59.56 | 64.027 | 66.13564148 |
| 10 | 56.96 | 60.72740093 | −6.479166667 | 62.656 | 67.87733333 | 66.21517502 |
| 11 | 71.47 | 59.95261072 | 8.030833333 | 64.323 | 70.219275 | 66.29470856 |
| 12 | 57.9 | 59.17782051 | −5.539166667 | 57.9 | 63.69 | 66.37424209 |
| 13 | 53.15 | 58.4030303 | | | | 66.45377563 |
| 14 | 45.41 | 57.62824009 | | | | 66.53330917 |
| 15 | 68.18 | 56.85344988 | | | | 66.61284271 |
| 16 | 61.38 | 56.07865967 | | | | 66.69237624 |
| 17 | 60.02 | 55.30386946 | | | | 66.77190978 |
| 18 | 55.67 | 54.52907925 | | | | 66.85144332 |
| 19 | 53.98 | 53.74428904 | | | | 66.93097686 |
| 20 | 53.12 | 52.97949883 | | | | 67.01051039 |
| 21 | 57.53 | 52.20470862 | | | | 67.09004393 |
| 22 | 48.85 | 51.42991841 | | | | 67.16957747 |
| 23 | 61.33 | 50.65512821 | | | | 67.249111 |
| 24 | 62.18 | 49.880338 | | | | 67.32864454 |

Regarding the fourth example as shown in Table 6 and FIG. 6A, this is an example of a network link where the usage of the link is decreasing. This could be due to various reasons like migration of customers to other networks, etc. The proposed trend curve made using the modified data extends above the trend curve made with raw actual data. The trend curve made with actual data is clearly below some of the peaks in the actual data curve. The proposed trend curve meets all of the peaks, and in fact produces an over-build of the network link. In such a situation, the proposed trend curve can be downwardly adjusted to reduce over-build by suitably adjusting (e.g. decreasing) the time-based weighting factor, as shown in Table 7 and FIG. 6B. Table 7 and FIG. 6B show the effect of decreasing the time-based weighting factor from 1.2 (as in Table 6 and FIG. 6A) to 1.1 (as in Table 7 and FIG. 6B). As can be seen in FIG. 6B, when the time-based weighting factor is decreased to 1.1, the proposed trend curve is able to meet the peaks over weeks 13-24 while reducing over-build of the network link.

Figure 7:
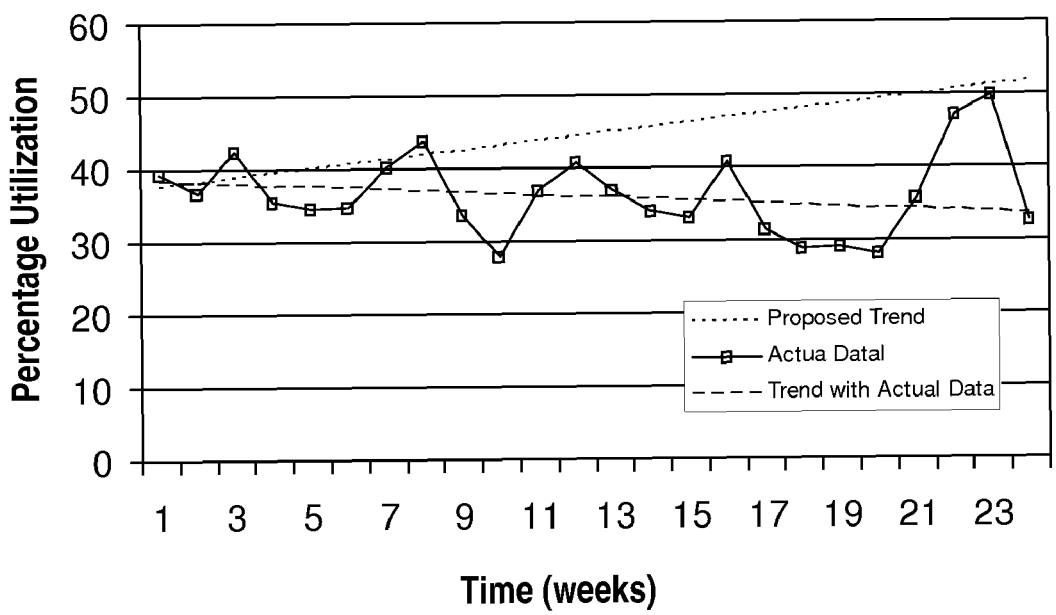
FIG. 7 is a graph depicting actual traffic data of a still further network link in percentage utilization of the network link over time, and overlaid with a trend curve used to forecast peak traffic requirements for the network link using actual data and a proposed trend curve used to forecast peak traffic requirements of the network link using modified data, according to an exemplary embodiment.

Table 8 set forth below shows results of the above analysis and calculations for the fifth example, and FIG. 7 is a corresponding graph of the results. The average percentage utilization of the percentage utilization values for weeks 1-12 in Table 8 and FIG. 7 is 37.21 and the standard deviation is 4.425451184.

TABLE 8

| Week | Actual Data | Trend With Actual Data | Actual Data Minus Average | Confidence Factor Applied | Time Weighting Factor Applied | Proposed Trend |
|---|---|---|---|---|---|---|
| 1 | 39.34 | 38.35576923 | 2.13 | 39.34 | 39.99566667 | 37.57422821 |
| 2 | 36.67 | 38.14744755 | −0.54 | 36.67 | 37.89233333 | 38.1889655 |
| 3 | 42.46 | 37.93912587 | 5.25 | 38.214 | 40.1247 | 38.8037028 |
| 4 | 35.4 | 37.7308042 | −1.81 | 35.4 | 37.76 | 39.41844009 |
| 5 | 34.59 | 37.52248252 | −2.62 | 34.59 | 37.4725 | 40.03317739 |
| 6 | 34.78 | 37.31416084 | −2.43 | 34.78 | 38.258 | 40.64791469 |
| 7 | 40.23 | 37.10583916 | 3.02 | 40.23 | 44.9235 | 41.26265198 |
| 8 | 43.86 | 36.89751748 | 6.65 | 39.474 | 44.7372 | 41.87738928 |
| 9 | 33.62 | 36.6891958 | −3.59 | 33.62 | 38.663 | 42.49212657 |
| 10 | 27.84 | 36.48087413 | −9.37 | 33.408 | 38.976 | 43.10686387 |
| 11 | 36.93 | 36.27255245 | −0.28 | 36.93 | 43.7005 | 43.72160117 |
| 12 | 40.8 | 36.06423077 | 3.59 | 40.8 | 48.96 | 44.33633846 |
| 13 | 36.86 | 35.85590909 | | | | 44.95107576 |
| 14 | 34.16 | 35.64758741 | | | | 45.56581305 |
| 15 | 33.12 | 35.43926573 | | | | 46.18055035 |
| 16 | 40.77 | 35.23094406 | | | | 46.79528765 |
| 17 | 31.53 | 35.02262238 | | | | 47.41002494 |
| 18 | 28.77 | 34.8143007 | | | | 48.02476224 |
| 19 | 28.94 | 34.60597902 | | | | 48.63949953 |
| 20 | 28.07 | 34.39765734 | | | | 49.25423683 |
| 21 | 35.72 | 34.18933566 | | | | 49.86897413 |
| 22 | 47.21 | 33.98101399 | | | | 50.48371142 |
| 23 | 49.78 | 33.77269231 | | | | 51.09844872 |
| 24 | 32.72 | 33.56437063 | | | | 51.71318601 |

Regarding the fifth example as shown in Table 8 and FIG. 7, the proposed trend curve made using the modified data extends above the trend curve made with actual data, which actually shows a downward trend. While the trend curve made with actual data is clearly below the peaks in the actual data curve, the proposed trend curve meets all the forecast growth points without much over-shoot. As can be seen in FIG. 7 with respect to the fifth example, the proposed trend curve provides a much better forecast of the growth of the usage of the network link being analyzed over weeks 13-24, as compared to the trend curve made with raw data values, which misses many peaks and would result in a failure to ensure QoS guarantees and meet SLA requirements for that link.

Thus, the traffic forecasting algorithm set forth above is able to correctly trend the traffic utilization to meet the peak requirements as against trending with raw actual data.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
   determining, by a processor, traffic data values for traffic over a network link that is used to provide one or more services to one or more customers, wherein the traffic data values are taken at intervals for a predetermined range of time;
   compiling, by the processor, a historical data set of peak traffic data values from the traffic data values;
   applying, by the processor, a mathematical confidence factor to the peak traffic data values in the historical data set to achieve modified data values;
   applying, by the processor, a time-based weighting factor to the modified data values to achieve further modified data values; and
   outputting, by the processor, a forecast trend curve of traffic over the network calculated using the further modified data values.

2. The method according to claim 1, further comprising modifying, by the processor, a capacity of the network link based on the forecast trend curve.

3. The method according to claim 1, further comprising determining, by the processor, an arithmetic mean of the peak traffic data values in the historical data set,
   wherein the mathematical confidence factor assigns a weight value to an individual peak traffic data value based upon a proximity in value of the individual peak traffic data value to the arithmetic mean.

4. The method according to claim 3, wherein the weight value assigned to the individual peak traffic data value is determined by:
   determining a standard deviation of the peak traffic data values in the historical data set;
   subtracting the arithmetic mean from the individual peak traffic data value to find a difference value; and
   determining the weight value from a predetermined list of weight values that each correspond to a value of the difference value.

5. The method according to claim 3, wherein the weight value assigned to the individual peak traffic data value is determined by:
   determining a standard deviation of the peak traffic data values in the historical data set;
   subtracting the arithmetic mean from the individual peak traffic data value to find a difference value; and
   determining the weight value from a predetermined list of weight values that each correspond to a value of the difference value as compared to the standard deviation.

6. The method according to claim 1, wherein the time-based weighting factor assigns a higher weight value to modified data values that correspond to peak traffic data values that are more recent than other peak traffic values in the historical data set, and a lower weight value to modified data values that correspond to peak traffic data values that are less recent than other peak traffic values in the historical data set.

7. The method according to claim 1, wherein the time-based weighting factor assigns a weight value to an individual peak traffic data value based upon a proximity in time of the individual peak traffic data value to a first-in-time peak traffic data value in the historical data set.

8. The method according to claim 1, further comprising:
   determining, by the processor, updated traffic data values for traffic over the network;
   recompiling, by the processor, the historical data set of updated peak traffic data values from the updated traffic data values;
   applying, by the processor, the mathematical confidence factor to each of the updated peak traffic data values in the historical data set to achieve modified updated data values;
   applying, by the processor, the time-based weighting factor to the modified updated data values to achieve further modified updated data values; and
   outputting, by the processor, the forecast trend curve of traffic over the network recalculated using the further modified updated data values.

9. The method according to claim 1, further comprising:
   adjusting, by the processor, the time-based weighting factor based on a comparison between the forecast trend curve and actual peak traffic data values for traffic over the network link during a period of time corresponding to the forecast trend curve;
   applying the adjusted time-based weighting factor to the modified data values to achieve further modified adjusted data values; and
   outputting the forecast trend curve of traffic over the network recalculated using the further modified adjusted data values.

10. The method according to claim 1, further comprising:
    determining, by the processor, updated peak traffic data values for traffic over the network;
    adjusting, by the processor, the time-based weighting factor based on a comparison between the forecast trend curve and the updated peak traffic data values;
    recompiling, by the processor, the historical data set of peak traffic data values from the updated peak traffic data values;
    applying, by the processor, the mathematical confidence factor to each of the updated peak traffic data values in the historical data set to achieve modified updated data values;

applying, by the processor, the adjusted time-based weighting factor to the modified updated data values to achieve further modified updated data values; and outputting, by the processor, the forecast trend curve of traffic over the network recalculated using the further modified updated data values.

11. The method according to claim 1, wherein the traffic data values for traffic over the network link are segmented into separate historical data sets for different types of services and/or different customers, and wherein forecast trend curves are separately calculated for the separate historical data sets.

12. The method according to claim 1, further comprising applying, by the processor, a correlation coefficient to the forecast trend curve, wherein the correlation coefficient is representative of a number of customers allocated to the network link, and wherein the correlation coefficient is removed from the forecast trend curve when the number of customers allocated to the network link reaches a predetermined maximum number.

13. A system comprising:
a first processor configured to audit a network link to determining traffic data values for traffic over the network link that is used to provide one or more services to one or more customers, wherein the monitoring device is configured to audit the traffic data values at intervals for a predetermined range of time; and
a second processor configured to compile a historical data set of peak traffic data values from the traffic data values, apply a mathematical confidence factor to the peak traffic data values in the historical data set to achieve modified data values, apply a time-based weighting factor to the modified data values to achieve further modified data values, and output a forecast trend curve of traffic over the network calculated using the further modified data values.

14. The system according to claim 13, wherein the second processor is further configured to determine an arithmetic mean of the peak traffic data values in the historical data set, and wherein the mathematical confidence factor applied by the second processor assigns a weight value to an individual peak traffic data value based upon a proximity in value of the individual peak traffic data value to the arithmetic mean.

15. The system according to claim 14, wherein the weight value assigned by second processor to the individual peak traffic data value is determined by:
determining a standard deviation of the peak traffic data values in the historical data set;
subtracting the arithmetic mean from the individual peak traffic data value to find a difference value; and
determining the weight value from a predetermined list of weight values that each correspond to a value of the difference value.

16. The system according to claim 14, wherein the weight value assigned by the second processor to the individual peak traffic data value is determined by:
determining a standard deviation of the peak traffic data values in the historical data set;
subtracting the arithmetic mean from the individual peak traffic data value to find a difference value; and
determining the weight value from a predetermined list of weight values that each correspond to a value of the difference value as compared to the standard deviation.

17. The system according to claim 13, wherein the second processor assigns a time-based weighting factor having a higher weight value to modified data values that correspond to peak traffic data values that are more recent than other peak traffic values in the historical data set, and a time-based weighting factor having a lower weight value to modified data values that correspond to peak traffic data values that are less recent than other peak traffic values in the historical data set.

18. The system according to claim 13, wherein the second processor assigns a time-based weighting factor to an individual peak traffic data value, wherein the time-based weighting factor has a weight value based upon a proximity in time of the individual peak traffic data value to a first-in-time peak traffic data value in the historical data set.

19. The system according to claim 13, wherein:
the first processor is further configured to determine updated traffic data values for traffic over the network; and
the second processor is further configured to recompile the historical data set of updated peak traffic data values from the updated traffic data values, apply the mathematical confidence factor to each of the updated peak traffic data values in the historical data set to achieve modified updated data values, apply the time-based weighting factor to the modified updated data values to achieve further modified updated data values, and output the forecast trend curve of traffic over the network recalculated using the further modified updated data values.

20. The system according to claim 13, wherein the second processor is configured to apply an adjusted time-based weighting factor to the modified data values to achieve further modified adjusted data values, and output the forecast trend curve of traffic over the network recalculated using the further modified adjusted data values, wherein the adjusted time-based weighting factor is based on a comparison between the forecast trend curve and actual peak traffic data values for traffic over the network link during a period of time corresponding to the forecast trend curve.

21. The system according to claim 13, wherein:
the first processor is further configured to determine updated peak traffic data values for traffic over the network; and
the second processor is further configured to recompile the historical data set of peak traffic data values from the updated peak traffic data values, apply the mathematical confidence factor to each of the updated peak traffic data values in the historical data set to achieve modified updated data values, apply an adjusted time-based weighting factor to the modified updated data values to achieve further modified updated data values, and output the forecast trend curve of traffic over the network recalculated using the further modified updated data values, wherein the adjusted time-based weighting factor is based on a comparison between the forecast trend curve and the updated peak traffic data values.

22. The system according to claim 13, wherein the second processor is further configured to apply a correlation coefficient to the forecast trend curve, wherein the correlation coefficient is representative of a number of customers allocated to the network link, and wherein the second processor is configured to remove correlation coefficient from the forecast trend curve when the number of customers allocated to the network link reaches a predetermined maximum number.

* * * * *